Figure 1:
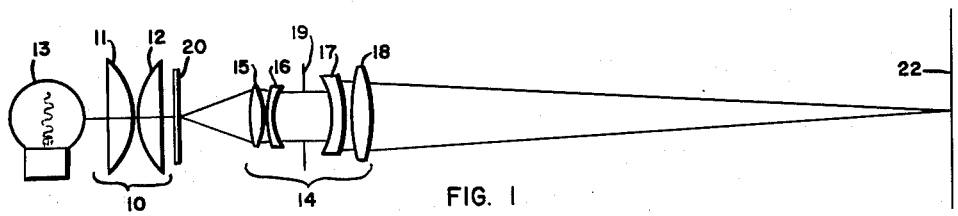

July 26, 1966   V. J. CARPENTER   3,262,359
OPTICAL SYSTEM
Filed Dec. 30, 1963

VANCE J. CARPENTER
INVENTOR.

BY
ATTORNEYS

United States Patent Office 3,262,359
Patented July 26, 1966

3,262,359
OPTICAL SYSTEM
Vance J. Carpenter, Rochester, N.Y., assignor to Bausch & Lomb Incorporated, Rochester, N.Y., a corporation of New York
Filed Dec. 30, 1963, Ser. No. 334,461
1 Claim. (Cl. 88—24)

This invention relates to an optical system and more particularly to an optical system for overcoming the adverse effect of scintillation in rear projection viewers.

Rear projection viewers such as contour projectors, projection microscopes and the like normally produce a fine granular appearance on the screen. This granular appearance changes as an observer changes his viewing position. During a change of the viewing angle the appearance of this structure is a scintillation although when the viewing angle is held constant the structure appears stationary.

The phenomenon of scintillation is annoying to an observer and results in the loss of detail in the projected image. Accordingly, several approaches have been taken in an attempt to eliminate scintillation. One approach relates to the development of screen materials which do not exhibit this property. Materials of this type have been developed, however, their use has been hampered by other serious limitations. For example, such screens have been found to have inadequate diffusion.

An alternative method for removing scintillation is to vibrate the screen. Vibrating the screen does not actually remove the phenomena, but causes it to move more rapidly than the eye is capable of following. The image on the vibrating screen appears to be on a uniform background. In order to overcome this effect of scintillation the screen should be moved in a psuedo random motion. The random type motion is desired in order to obtain integration in all directions. Motion of this type is difficult to achieve for any but very small screens. A similar approach uses two screens with adjacent diffusing surfaces separated by a small distance. A slow counter rotation of the two screens tends to overcome scintillation. However, in this case the image plane is not a single surface and there is a corresponding loss of resolution.

It has now been found, that the amount of scintillation is closely related to the numerical aperture of the beam incident upon the screen. For example, if the incident beam has a large numerical aperture there is no scintillation present. The use of high numerical apertures is relatively impractical since it is desirable in most rear projection viewers to obtain a high degree of magnification and by well known laws of optics this requires a small numerical aperture at the screen.

Advantageously, a system according to the present invention eliminates scintillation in a rear projection viewer without the adverse effects associated with loss of resolution, inadequate diffusion or mechanical difficulties.

Briefly, the present system includes a lens having a magnification of plus unity positioned between a projection lens and a screen in a rear projection viewer. Preferably the lens is disposed relatively close to the projection lens with respect to its distance to the screen. Means are provided for rotating the lens about an axis which is displaced from the optical axis of the lens. Accordingly, the position of the lens having plus one magnification is changed without changing the position or magnification of the final image.

Figure 2:
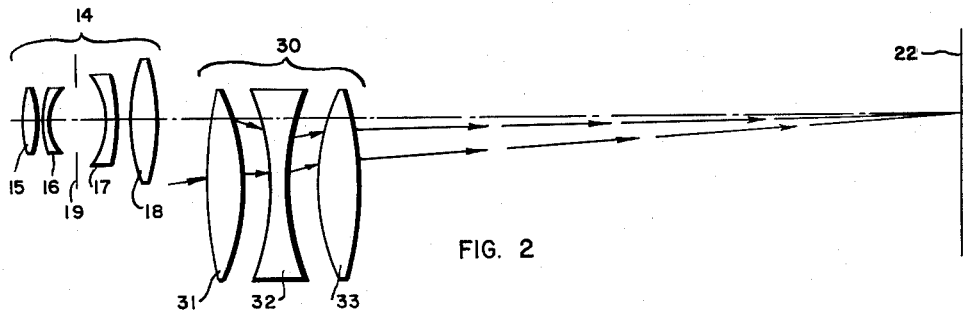
Figure 3:
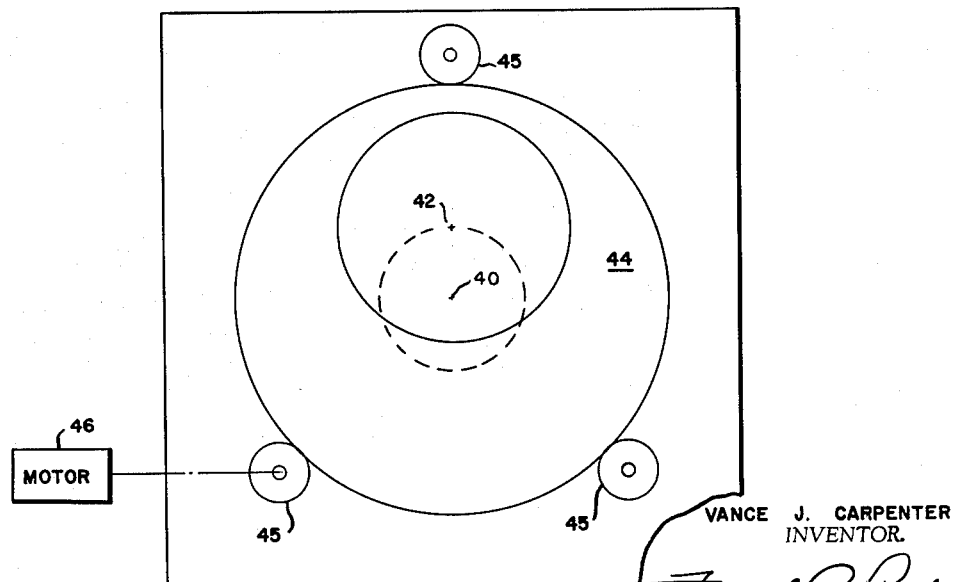

The invention will now be described in more detail in connection with the accompanying drawings; in which, FIG. 1 is an optical diagram of a rear projection viewer;

FIG. 2 is an optical diagram showing a portion of the rear projection viewer shown in FIG. 1 but also including means for changing the direction of the beam incident on the screen; and, FIG. 3 is a diagrammatic view illustrating the relative position of the optical axes of a rear projection viewer; a beam displacer and the axis of rotation of the beam displacer.

Like reference numerals have been used throughout the figures to illustrate similar parts. A condensing system 10 including a pair of lenses 11 and 12 condenses the light from a source 13. The beam of condensed light is directed toward a projection lens assembly 14 which includes the lenses 15, 16, 17 and 18 as well as an aperture stop 19. An object 20 is disposed in the object plane on the optical axis of the system, between the condenser system 10 and projection lens assembly 14. An image of the object is projected by the lens assembly 14 to an image plane 22. The image plane 22 comprises a screen of the type commonly used in rear projection viewers.

The scintillation pattern is a function of the direction of the incident beam. Accordingly, it is desirable to shift the direction of the incident beam sufficiently to change what would otherwise comprise a dark area in the pattern to a light area. Rapidly changing the direction of the incident bundle of light rays changes the pattern to thereby average out the scintillating effect in a manner similar to that done by a moving screen.

A novel system according to the present invention includes means for rapidly changing the direction of the incident beam. One embodiment of the present invention is described with respect to FIG. 2. A rotating beam displacer 30 comprises a plus-1 magnification lens assembly positioned between the projection lens assembly 14 and the image plane or screen 22. The rotating displacer 30 is axially displaced from the projection system and preferably disposed relatively close to the projection lens assembly 14 with respect to its distance from the image plane 22. The axis of rotation of the displacer 30 preferably coincides with and is parallel to the axis of projection since this facilitates the lens design. It should be understood, however, that the axis of rotation may be displaced from the optical axis of the displacer but may not coincide with the optical axis of the displacer system.

The relative positions of the optical axis of the displacer 30 and projection system is shown more clearly with reference to FIG. 3. The axis 40 of the projection system is displaced from but parallel to the axis of the displacer 42. The displacer is preferably rotated about the axis 40. For example, the lens assembly may be mounted in a rotatable disc 44. The disc 44 is rotatable at about 3600 r.p.m. within the bearings 45 by means of a motor 46. The auxiliary lens is displaced a predetermined distance from the projection lens axis, the virtual object for the auxiliary lens appears at an object distance from its axis equal to the distance of displacement from the projection axis. Since the auxiliary lens works at a magnification of plus-1, it will form an image at a similar distance from its axis. Therefore, the final image formed by the auxiliary lens is in the same position as the original image even though the auxiliary lens is off center.

The direction of the image-forming beam is proportional to the displacement of the auxiliary lens from the projection lens axis. Therefore, rotation of the displacer 30 about the projection lens axis or about some other axis, forms an image, wherein the image-forming bundle of light rays will sweep a cone with a half angle proportional to the displacement. The final image is therefore parallel to the original image.

The auxiliary lenses 31, 32, 33 which act as the beam displacer 30 are preferably larger than the projection lenses, so that, the entire free aperture of the projection lens will be acceptable during rotation of the displacer 30. This overcomes for any loss of light other than reflected losses in the final image. In some cases two lenses including a positive and negative lens have been used in place of the three elements shown in FIG. 2. A three-component optical system is presently preferred in order to maintain the screen in the same image plane.

I claim:

A rear projection viewer comprising an object plane whereat an object is held to be projected onto a screen,
- said viewer further comprising a light source and a condenser aligned to illuminate said object,
- a projection lens system including a pair of positive lenses and a negative lens aligned therebetween constituting a beam displacer, said lens system being located to form an immobile image of said object on said screen which is optically conjugate to said object plane,
- a rotatable member which is mounted for rotation in a plane normal to the projection axis of said viewer and is located substantially concentrically of said axis, said beam displacer lens being held in said member eccentrically of said axis by a dimension less than the effective radius of said lens so as to function as a rotating beam displacer,
- means operatively constructed to rotatably support said member, and
- means for rotating said member at about 3600 revolutions per minute
- whereby the image rays formed by said lens are focused at a stationary point on said screen while rotating about said axis to eliminate scintillation of the screen.

References Cited by the Examiner

UNITED STATES PATENTS

| | | | |
|---|---|---|---|
| 2,055,696 | 9/1936 | Marshall | 88—24 |
| 2,588,373 | 3/1952 | Erban | 88—57 |
| 3,194,142 | 7/1965 | Black | 95—75 |

FOREIGN PATENTS

| | | |
|---|---|---|
| 947,764 | 7/1949 | France. |
| 394,285 | 6/1933 | Great Britain. |

NORTON ANSHER, *Primary Examiner.*

HAROLD H. FLANDERS, *Assistant Examiner.*